United States Patent [19]

Morgan et al.

[11] Patent Number: 5,344,867

[45] Date of Patent: Sep. 6, 1994

[54] VINYLIDENE CHLORIDE EMULSION INTERPOLYMER COMPOSITION

[75] Inventors: Tamela A. Morgan, Olmsted Township, Cuyahoga County; Gary L. Julian, Parma; Vic Stanislawczyk, North Ridgeville, all of Ohio

[73] Assignee: The BFGoodrich Company, Akron, Ohio

[21] Appl. No.: 76,323

[22] Filed: Jun. 14, 1993

[51] Int. Cl.$^5$ ................................................. C08F 2/16
[52] U.S. Cl. .................................... 524/460; 524/458; 524/521; 524/522
[58] Field of Search ............... 524/458, 460, 502, 521, 524/522

[56] References Cited

U.S. PATENT DOCUMENTS

| | | | |
|---|---|---|---|
| 3,424,706 | 1/1969 | Smith et al. | 524/458 |
| 4,011,388 | 3/1977 | Murphy et al. | 526/201 |
| 4,150,005 | 4/1979 | Gehman et al. | 524/460 X |
| 4,448,923 | 5/1984 | Reeb et al. | 524/460 |
| 4,459,378 | 7/1984 | Ugelstad | 524/458 X |
| 4,569,964 | 2/1986 | Lee et al. | 524/460 |
| 4,613,633 | 9/1986 | Sekiya et al. | 524/460 X |
| 5,106,903 | 4/1992 | Vanderhoff et al. | 524/458 |

*Primary Examiner*—Judy M. Reddick
*Attorney, Agent, or Firm*—George W. Moxon, II

[57] ABSTRACT

An aqueous emulsion interpolymer composition capable of forming stable films which have excellent protective properties, especially on metallic substrates, good chemical resistance and/or permeability to water vapor, comprising particles suspended in an aqueous solution made by interpolymerizing an acrylic latex seed particle with a vinylidene chloride polymer comprising vinylidene chloride, one or more alkyl acrylates having from 1 to 18 carbon atoms in the alkyl group and/or one or more alkyl methacrylates having 1 to 18 carbon atoms in the alkyl group, one or more aliphatic alpha-beta-unsaturated carboxylic acids, and a copolymerizable surface active agent, the proportion of vinylidene chloride being 65 to 90 parts by weight, the portion of said alkyl acrylates and/or methacrylates being from 2 to 30 parts by weights, the portion of said carboxylic acids being from 0.1 to 20 parts by weight, and the portion of said copolymerizable surface active agent being from 0.1 to 5.0 parts by weight.

10 Claims, No Drawings

VINYLIDENE CHLORIDE EMULSION INTERPOLYMER COMPOSITION

BACKGROUND OF THE INVENTION

This invention relates to an improved surface coating composition capable of forming stable films having excellent protective properties, especially on metallic substrates. In particular the present invention is directed to an improved vinylidene chloride interpolymer latex for use as a metal coating.

The use of vinylidene chloride polymers as coatings is known. For example, U.S. Pat. Nos. 4,341,679 and 4,435,478 disclose coatings for metallic substrates where the polymer consists essentially of vinylidene chloride, vinyl chloride, an alkyl acrylate or methacrylate, and an unsaturated carboxylic acid. U.S. Pat. Nos. 4,945,134 and 5,039,751 disclose vinylidene chloride copolymers having barrier properties for use as a coating on polymer films which comprise vinylidene chloride monomers as a first phase interpolymerized with ethylenically unsaturated monomers, such as alkyl acrylates or methacrylates, or acrylic or methacrylic acid as a second phase. U.S. Pat. No. 3,291,769 teaches a process for manufacturing polyvinylidene chloride emulsions used as barrier coatings on paper and films. U.S. Pat. No. 3,787,232 discloses vinylidene chloride polymers capable of being cured at low temperatures for use as coatings for fibrous materials, where the vinylidene chloride is copolymerized with carboxylic monomers and N-alkylol amide. U.S. Pat. No. 4,058,649 teaches a coating composition for coating thermoplastic film substrates, such a biaxially oriented polypropylene film substrate, which is heat sealable and which is an interpolymer of methacrylic acid and mixtures with acrylic acid, an alkyl acrylate, and vinylidene chloride.

Overpolymer compositions comprised of vinylidene chloride copolymers polymerized as layers over a core material are known for use as paper wraps, coated food films or containers. Examples of vinylidene chloride overpolymers are U.S. Pat. Nos. 3,291,768; 3,309,330; 3,379,665; 4,307,006; 4,898,782; 4,965,130; and 4,997,859. Most of these use a vinylidene chloride core or seed for the overpolymerization. In the case of U.S. Pat. Nos. 4,898,782; 4,965,130; and 4,997,859, the core layer is a copolymer of a methacrylate and an acrylate ester, because it imparts to the coated films the properties of high heat-seal strength, and the core seed particles are made by the extrusion polymerization of the two monomers.

Intertwined polymer networks in which a first polymer network is intertwined on a molecular scale with a second polymer network are known, such as is disclosed in U.S. Pat. No. 5,169,884 to M. K. Lindemann et al. The disclosed polymer is useful as a binder of fibers or fabric, such as fiberfill or as industrial or architectural coatings. The first polymer is an ethylenically unsaturated compound while the second polymer preferably contains styrene, but the phases are selected by their inability to polymerize conventionally. The intertwined polymer is formed by mixing the second monomer as an emulsion with the first polymer, which is also an emulsion, allowing them to equilibrate and then polymerizing.

SUMMARY OF THE INVENTION

The present invention has resulted from the discovery that a vinylidene chloride polymer can be interpolymerized with a styrene acrylic latex composition and provides stable film having excellent protective properties especially on metallic substrates.

The aqueous latex polymer composition of the present invention comprises interpolymer particles suspended in an aqueous solution. The interpolymer particles comprise swellable styrene acrylic latex seed particles interpolymerized with a vinylidene chloride polymer comprised of vinylidene chloride, one or more alkyl acrylates having from 1 to 18 carbon atoms in the alkyl group and/or one or more alkyl methacrylates having 1 to 18 carbon atoms in the alkyl group, one or more aliphatic alpha-beta-unsaturated carboxylic acids, and a copolymerizable surface active agent. The proportion of vinylidene chloride will be in the range of about 65 to 90 parts by weight, the portion of said alkyl acrylates and/or methacrylates will be in the range of about 2 to 30 parts by weights, the portion of said carboxylic acids will be in the range of about 0.1 to 20 parts by weight, and the portion of said copolymerizable surface active agent will be in the range of about 0.1 to 5.0 parts by weight.

The process for preparing an aqueous latex polymer composition in accordance with the present invention comprises providing an acrylic latex comprising an aqueous medium having dispersed therein particles of styrene acrylic polymer, and adding to said acrylic latex, the vinylidene chloride and other monomers under conditions at which the vinylidene chloride will form a polymer within said acrylic particles, whereby a polymer composition comprising acrylic latex particles having a vinylidene chloride polymer polymerized therein are formed. The latex composition of the present invention has a reduced tendency to settle, a low VOC (volatile organic compounds) coalescent need in forming useable coatings, improved humidity resistance, and improved hardness development.

The aqueous latex polymer compositions can be formulated with, for example, anticorrosive pigments, and can be used for various metal maintenance coatings, such as maintenance primers and coatings, automotive chassis or underhood coatings, rust converting products, overprint varnishes, concrete coatings, flame retardant coatings for textiles, and barrier coatings for paper.

DETAILED DESCRIPTION OF THE INVENTION

The overpolymer latex compositions of the present invention are made by polymer/zing a vinylidene chloride polymer with acrylic seed particles. The vinylidene chloride copolymer forms an interpolymer in and with the acrylic latex seed particles.

We define interpolymerized to mean a largely physical mixture, in that the acrylate polymers and the vinylidene polymers described in this invention, are intimately mixed on a molecular level. While we define an interpolymer as a largely physical mixture of polymers, we do not preclude the possibility of grafting nor physical entanglements nor chemical reaction between polymers since the precise mechanism is still speculative. In fact such associations are likely, and are believed to be the reason for the enhanced properties of the finished interpolymer. Many factors including ingredient selection and polymerization conditions, such as polymerization temperature, instantaneous free monomer concentration, initiator type, and the presence of double bonds or abstractable hydrogen in the seed polymer, may influence grafting between the acrylate and vinylidene phases, and thus may have consequences in the final structure and performance of the finished interpolymer.

There is no criticality in the manufacture of the acrylic seed particles, although a styrene-acrylic copolymer seed particle is preferred. Small particle size is preferred, since the resulting interpolymer can also have a smaller particle size and smaller particle size vinylidene latexes tend to settle less, and have an advantage in film formation. A preferred size for the seed particles is 2000 Angstroms or less. The seed latex must swell in the presence of the vinylidene monomer feed. A seed latex that does not swell will tend to form an "overpolymer" or layered structure. The seed latex preferably forms water resistant films if water resistance is a requirement in the final application. The presence of water sensitive surfactants, or other water sensitive ingredients may compromise the water resistance of the final interpolymer. Styrene acrylic polymer latexes intended for industrial coatings applications, due to good water resistance requirements, are typically good seed polymer choices. The seed latex should not contain excess surfactants that might promote excess initiation of new and separate vinylidene particles; also excess surfactants often compromise water resistance of polymer films.

Styrene acrylic latexes are commercially available, such as Carboset CR-760 acrylic latex available from The B F Goodrich Company as a 42% by weight acrylic copolymer emulsion. Others include Carboset CR761 polymer and Carboset CR763 polymer from B F Goodrich, HG 54 from Rohm & Haas, A622 polymer from Zeneca, Inc., and Pliolite 7103 polymer from Goodyear. Styrene acrylic latexes are made by emulsion polymerization techniques known to those skilled in the art, such as U.S. Pat. No. 4,968,741, which is incorporated herein by reference. There is no criticality in the ratio of styrene to acrylate, nor in the particular acrylate used as long as the seed swells in the vinylidene monomer feed. Other acrylic latexes can be employed as long as they provide a swellable seed particle in the same manner as the styrene acrylate does. The amount of styrene acrylate seed polymer to be employed in the latex polymer composition is not critical. If too little seed polymer is used, then larger particle sizes may result and produce consequential handling difficulties. If too much seed polymer is used, a latex polymer with diminished properties will result. Usually, about 2 to 50 weight percent, based upon the total weight of the acrylate polymer and the vinylidene chloride copolymer, will be employed, with about 5 to 15% by weight being preferred.

The vinylidene chloride coating composition comprises a combination of vinylidene chloride monomer, one or more alkyl acrylates having from 1 to 18 carbon atoms in the alkyl group and/or one or more alkyl methacrylates having 1 to 18 carbon atoms in the alkyl group, one or more aliphatic alpha-beta-unsaturated carboxylic acids, and a copolymerizable surface active agent.

The amount of vinylidene chloride monomer will be in the range of about 65 to 90 parts by weight, with 70 to 83 parts by weight being preferred. The portion of said alkyl acrylates and/or methacrylates will be in the range of about 2 to 30 parts by weights, with 25 to 16 parts by weight being preferred. The portion of said carboxylic acids will be in the range of about 0.1 to 10 parts by weight, with 1 to 5 parts by weight being preferred. The portion of said copolymerizable surface active agent will be in the range of about 0.1 to 5.0 parts by weight, with 0.4 to 1.0 parts by weight being preferred.

The vinylidene chloride monomer can be used with up to 25% by weight vinyl chloride monomer, based upon the weight of the vinylidene chloride monomer. Although, the use of 100% vinylidene chloride monomer is preferred.

The alkyl acrylates or methacrylates are (meth)acrylate ester monomers of (meth)acrylic acid that have the formula

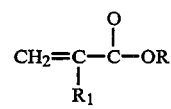

where R is selected from the group consisting of an alkyl radical containing 1 to 18 carbon atoms, an alkyoxyalkyl radical containing a total of 1 to 10 carbon atoms, and a cyanoalkyl radical containing 1 to 10 carbon atoms, and $R_1$ is selected from the group consisting of hydrogen and methyl. The alkyl structure can contain primary, secondary, or tertiary carbon configurations and normally contains 1 to 8 carbon atoms. Examples of such (meth)acrylic esters are ethyl (meth)acrylate, propyl (meth)acrylate, n-butyl (meth)acrylate, isobutyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate, n-octadecyl (meth)acrylate, and the like; methoxymethyl (meth)acrylate, methoxyethyl (meth)acrylate, ethoxyethyl (meth)acrylate, butoxyethyl (meth)acrylate, ethoxypropyl (meth)acrylate, and the like; α and β-cyanoethyl (meth)acrylate, α,β- and γ-cyanopropyl (meth)acrylate, cyanobutyl (meth)acrylate, cyanohexyl (meth)acrylate, cyanooctyl (meth)acrylate, and the like; hydroxyalkyl (meth)acrylates as hydroxyethyl (meth)acrylates and the like and mixtures thereof.

More preferred are the (meth)acrylic esters wherein R is an alkyl group containing 1 to about 8 carbon atoms or an alkoxyalkyl group containing a total of 1 to about 6 carbon atoms. Examples of such more preferred monomers are ethyl (meth)acrylate, propyl (meth)acrylate, n-butyl (meth)acrylate, n-pentyl (meth)acrylate, n-hexyl (meth)acrylate, n-octyl (meth)acrylate, 2-ethylhexyl (meth)acrylate, and the like; methoxyethyl (meth)acrylate, ethoxyethyl (meth)acrylate, and the like; and mixtures thereof.

The selection of the (meth)acrylates is not critical and various combinations can be employed. The choice will depend upon the requirements for the film with respect to hardness, flexibility, and/or water sensitivity. The swellability of the combination of monomers in the vinylidene chloride phase should be considered in selection of the (meth)acrylates.

The carboxylic monomers useful in the production of the polymer latexes of this invention are the aliphatic alpha-beta-olefinically-unsaturated carboxylic acids and dicarboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thusly

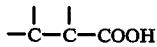

or as a part of a terminal methylene grouping thusly $CH_2C<$. Olefinically-unsaturated acids of this broad class includes such widely divergent materials as the acrylic acids such as acrylic acid itself, methacrylic acid, ethacrylic acid, alpha-chloro acrylic acid, alpha-cyano acrylic acid and others, crotonic acid, sorbic acid, cinnamic acid, hydromuconic acid, itaconic acid, citraconic acid, mesaconic acid, muconic acid, glutaconic acid, aconitic acid, $\beta$-carboxy ethyl acrylate and others. As used herein, the term "carboxylic acid" includes the polycarboxylic acids and acid anhydrides, such as maleic anhydride, wherein the anhydride group is formed by the elimination of one molecule of water from two carboxyl groups located on the same polycarboxylic acid molecule.

The preferred carboxylic monomers for use in this invention are the monoolefinic acrylic acids having the general structure

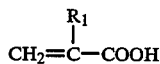

wherein $R_1$ is a substituent selected from the class consisting of hydrogen, halogen, monovalent alkyl radicals, monovalent aryl radicals, monovalent aralkyl radicals, monovalent alkaryl radicals and monovalent cycloaliphatic radicals. Illustrative acrylic acids of this class are acrylic acid itself, methacrylic acid, ethacrylic acid, chloro-acrylic acid, bromo-acrylic acid, cyano-acrylic acid, alpha-phenyl acrylic acid, alpha-benzyl acrylic acid, alpha-cyclohexyl acrylic acid, and others. Of this class, acrylic acid and methacrylic acid are preferred.

The copolymerizable surfactant both facilitates and becomes part of the vinylidene interpolymer in the acrylic particles. Though higher levels of surfactants may be employed to replace the copolymerizable surfactant, low free surfactant levels offer advantages in water and particularly humidity resistance. Furthermore, higher surfactant levels may plasticize the vinylidene interpolymer, possibly damaging moisture vapor and gas transmission resistance and thus compromising salt spray performance. Thus, the preferred levels of copolymerizable surfactant allow use of very low levels of free surfactant, leading to performance advantages. In applications where performance demands allow, lower levels of copolymerizable surfactant within the stated ranges may be used with higher levels of free surfactants. Adjustments in polymerization conditions and ingredients known to those skilled in the art might be necessary to produce latexes with acceptable cleanliness and morphology as levels of copolymerizable surfactant and free surfactant are changed. The preferred copolymerizable surfactant is the sodium salt of an allyl ether sulfonate. They are commercially available, for example, as COPS 1 from Rhone Poulenc, Inc., which is sodium 1-allyloxy-2-hydroxypropyl sulfonate, which is supplied as a 40% solution in water.

The interpolymer latex compositions of the present invention are prepared by using emulsion polymerization techniques known to those skilled in the art. The vinylidene chloride monomers and other monomers, along with the copolymerizable surfactant and any surfactants and initiators may be batched, metered or otherwise added to particles of styrene acrylate dispersed in an aqueous medium. The polymerization is usually done at between about 50° C. and 75° C., although the temperatures may vary between 5° C. and 100° C., and takes about 2 to 24 hours. The reaction time is largely dictated by the heat removal capabilities of the reactor employed, with shorter reaction times being preferred. The total solids content of the finished latex will usually be 40–65%. The polymerizations are preferably conducted in the absence of air or oxygen.

By way of example, the emulsion polymerization reaction which was used to produce the polymers in the Examples is set forth below.

A monomer premix was made and comprised the monomers, a major portion of the emulsifier and approximately half of the demineralized water at ambient temperature. The reactor was charged with a minor amount of emulsifier, a major amount of initiator, the copolymerizable surfactant, and the styrene acrylate polymer seed dispersed in an aqueous medium. This aqueous mixture was brought to reaction temperature in a nitrogen blanket, about 70° C., and the monomer premix was metered in over a five hour period while the temperature was maintained at 70° C. At the end of this period aliquots of additional initiators were added at timed sequences. The reaction was allowed to run an additional 90 minutes to complete the reaction. during the last hour, the temperature was maintained at 40° C. In general, the solid contents of the resulting latex was near 60 percent.

The addition of the emulsifier, commonly referred to as a "soap" or "surfactant", is conventional. It may be added to the reactor or premixed with the other ingredients, or distributed between the reactor and the premix, or otherwise added during the polymerization. The amount of surfactant used is in the range of from about 0.01 to about 10 parts per hundred resin monomer (phr) preferably from about 0.05 to 0.5 phr.

Known alkyl sulfates or sulfonate surfactants normally used in the preparation of polymers containing bound carboxyl groups may be employed. These include sodium lauryl sulfate, ammonium lauryl sulfate, sodium n-dodecylbenzene sulfonate, a sodium alkyl sulfonate wherein the alkyl averages $C_{18}H_{37}$ and a sodium alkyl sulfonate containing about 75% $C_{14}$ to $C_{16}$ saturated alkyl groups with the remainder of about half and half $C_{10}$ to $C_{13}$ and $C_{17}$ to $C_{18}$. Sodium lauryl sulfate is preferred. The use of surfactants is not critical but is done to maintain the stability of the latex. Surfactants which can be effective at low levels are preferred.

The initiator, often in combination with an oxidation-reduction catalyst, is used in an amount which results in a suitable rate of polymerization chosen to provide a desirable temperature profile during the course of formation of the latex. Commonly used initiators include the free radical initiators such as the peroxygen compounds and persulfates, particularly benzoyl peroxide, t-butyl diperphthalate, pelargonyl peroxide and 1-hydroxycyclohexyl hydroperoxide; azo compounds such as azodiisobutyronitrile and dimethylazodiisobutyronitrile. Particularly useful initiator are the water-soluble peroxygen compounds such as hydrogen peroxide and sodium, potassium and ammonium persulfates used by themselves, or in activated systems. Typical oxidation-reduction systems include alkali metal persulfates in combination with a reducing substance such as polyhydroxyphenols, oxidizable sulfur compounds such as sodium sulfite, sodium bisulfite, reducing sugars, dimethylamino proprionitrile, diazomercapto compounds, and water-soluble ferricyanide compounds. Heavy metal ions may also be used to activate persulfate catalyzed polymerizations. The preferred initiator for use in the process of the present invention is ammonium persulfate.

The initiator, most preferably an alkali metal or ammonium persulfate, may be conventionally charged either to the reactor, or mixed into the premix, or both, or incrementally added separately to control the rate of polymerization. The amount of initiator used is in the range from about 0.01 to about 10 phr, preferably from about 0.1 to 1.0 phr.

In addition, the polymerization free-radical generating agents can be used alone or are used with redox systems in amounts of 0.05 to 1.0 phr. Chemically stripping unreacted monomers or the use of steam stripping, or a combination may be employed.

EXAMPLE 1

An aqueous latex polymer was made in a stirred polymerization reactor as set forth generally above using the following ingredients:

| | Parts by Weight |
|---|---|
| 1) Vinylidene chloride (VDC) | 79.1 |
| 2) 2-Ethyl hexyl acrylate (2EHA) | 9.0 |
| 3) Methyl methacrylate (MMA) | 9.0 |
| 4) Acrylic acid (AA) | 1.0 |
| 5) Methacrylic acid (MAA) | 1.9 |
| 6) Sodium lauryl sulfate | 0.18 |
| 7) Sodium allyl ether sulfonate | 0.5 |
| 8) Styrene acrylate seed particles | 10.0 |
| 9) Ammonium persulfate | 0.5 |
| 10) Water enough to make a 60% solids emulsion | |

EXAMPLE 2

| | Parts by Weight |
|---|---|
| 1) Acrylic acid | 1 |
| 2) Methacrylic acid | 1.9 |
| 3) Sodium lauryl sulfate | 0.18 |
| 4) 2-Ethyl hexyl acrylate | 9 |
| 5) Vinylidene chloride | 73.1 |
| 6) Vinyl chloride | 15.0 |
| 7) Ammonium persulfate | 0.4 |
| 8) Sodium allyl ether sulfonate | 0.5 |
| 9) Styrene acrylate seed polymer | 10.0 |
| 10) Enough water to make a 53% by weight solids emulsion | |

Latex polymer compositions were then used to coat metal substrate surfaces to demonstrate their film forming ability and to evaluate the performance of the film as a metal coating. The latexes were employed in a red oxide primer formulation (set forth in Example 3), which was applied to treated (with iron phosphate) and untreated cold rolled steel (CRS) surfaces for evaluation. This coating composition was applied to steel test panels, namely type Q-Panels, which is an untreated steel or CRS, and Bondrite 1000 or B1000, which is a treated steel, with Bird applicators having clearances of 0.003 inch (0.07 m) and 0.006 inch (0.14 m). The coating was allowed to dry at ambient for 12 days before testing. The tested coatings resulted in dry film thicknesses of about 0.001 inch (1 mil) and 0.003 inch (3 mil).

EXAMPLE 3

| | % by Weight |
|---|---|
| Premix for Pigment Dispersion | |
| Water | 3.9 |
| Colloids 642 (silicon defoamer) | 0.1 |
| Methocel J12MS (methyl cellulosic thickener) | 8.0 |
| Pluronic F 87 (ethylene oxide/ propylene oxide block copolymer surfactant) | 0.7 |
| Pigment Dispersion | |
| Zinc Phosphate | 5.7 |
| Calcium Carbonate | 16.3 |
| Red Iron Oxide | 2.6 |
| Colloids 642 | 0.1 |
| Stabilization Step | |
| Pluronic F87 | 2.4 |
| Texanol (ester alcohol coalescent) | 1.0 |
| Latex Polymer | 59.2 |
| Polymer | |

After combining the ingredients for the pigment dispersion under agitation in a mixing vessel and stabilizing the dispersion, 59.2% by weight of the latex polymer is added slowly.

The primer is then coated on the metal substrates where it can be evaluated at one and three mil dry thicknesses. The three rail thickness is a typical application, and such resulting films were evaluated for hardness, then scribed, where two lines forming an X are scribed through the coating with a sharp instrument, for salt spray test evaluation at 500 and 1000 hours in accordance with ASTM procedure B-117, an elongation test with a conical mandrel apparatus in accordance with ASTM D-522, and an impact resistance test in accordance with ASTM D-2794. Salt spray evaluations made in accordance with ASTM D-714 range from excellent or no blisters, to few blisters (F), to medium frequency of blisters (M), to medium dense frequency of blisters (MD), to dense frequency of blisters (D) and blister sizes from very small (#8) to large (#2). Further, one rail thickness films on untreated CRS panels were subjected to a humidity resistance test on cold rolled steel in accordance with ASTM D-2247.

Samples, shown in Table I, based upon Example I, with variances noted, and a commercial protective coating polymer (namely Haloflex 202 maintenance polymer, a vinylidene chloride/vinyl chloride/acrylic emulsion, available from Zeneca, Inc.) were evaluated in the metal primer coatings discussed above in accordance with ASTM procedures. The results of the evaluation are presented in Table II:

TABLE I

| Polymer Sample | Modification (Sample is the same as Example I except as indicated) |
|---|---|
| A | Commercially available vinylidene chloride polymer |
| B | None |
| C | Higher (12%) seed particle content used |
| D | Lower Tg (by using less methylmethacrylate (6%) and more 2EHA (12%)) |
| E | Lower (70%) VDC level plus 2EHA is 17% and MMA is 10% |
| F | Higher (85%) VDC level; 2EHA is |

TABLE I-continued

| Polymer Sample | Modification (Sample is the same as Example I except as indicated) |
| --- | --- |
| G | 12% and MMA is 0% Lower carboxyl (2%) level; 2EHA is 12%, MMA is 7% and AA is 0% |

As shown in Table II, the films made in accordance with the present invention exceed the hardness requirements where a Konig hardness of 8 or greater or a pencil hardness of 2B or greater (1B is the softest rating, while 6H is the hardest rating) is considered acceptable. All samples showed an excellent elongation in the conical mandrel apparatus. Further, the samples performed acceptably in the salt spray and humidity resistance tests by showing minimum blistering and lifting and adhesion at the scribe. Further, all of the polymers had a moisture vapor transmission rate (MVTR) of less than 4 grams per 100 square inches per 24 hours.

TABLE II

| Coating Sample | Hardness | | Impact (inch-pounds) | | Salt Spray Test (3MIL FILM) | | | | | Condensing Humidity Test (1MIL FILM) | |
| --- | --- | --- | --- | --- | --- | --- | --- | --- | --- | --- | --- |
| | Konig | Pencil | Direct | Reverse | Substrate | Field 500 Hours | 1000 Hours | Scribe 500 Hours | 1000 Hours | Observations at 500 Hours | Observations at 1000 Hours |
| A | 11 | H | 110 | 60 | CRS | F #8 | F #4 | F #8 | F #8 | blushing, blister recovered, slight whitening | blushing, blistering, blushing recovered, slight white |
| | | | | | B1000 | Excellent | M #6 | Excellent | Excellent | | |
| B | 21 | 2H | 40 | 0 | CRS | Excellent | Excellent | F #8 | F #8 | blushing recovery, white on panel | blushing, recovery, whitening on panel |
| | | | | | B1000 | F #8 | F #8 | F #6 | F #6 | | |
| C | 21 | H | 55 | 0 | CRS | Excellent | Excellent | Excellent | F #8 | MD #8 blisters, blushing no recovery, panel whitened | D #8 blisters, blushing, no recovery, whitening on panels |
| | | | | | B1000 | F #8 | F-M #8 | F #8 | F-MD #8 | | |
| D | 12 | H | 90 | 20 | CRS | Excellent | Excellent | F #8 in one spot | F #8 | blushing recovered well, slight whitening present | blushing recovers, slight whitening |
| | | | | | B1000 | F #8 | F-M #8 | MD #6 | MD #6 | | |
| E | 15 | H | 30 | 8 | CRS | Excellent | MD #8 | D #8 | D #8 & 6* | blushed slight, recovery | blushing occurred, recovery |
| | | | | | B1000 | F #8 | MD-D #8 | MD #8 | D #8 | | |
| F | 21 | 2H | 50 | 8 | CRS | MD #2 | D #2 | MD #2 | D #2** | blush did recover but MD #2 blisters present that did not recover | MD #6 blisters, blush recovered, blisters did not |
| | | | | | B1000 | M #2 | D #2 | Coating released from panel | Coating released from panel | | |
| G | 12 | H | 150 | 130 | CRS | F #8 | M #8 | M #8 | M #8 | blush recovered, no whitening | blushing occurred, did not recover, no whitening, however H2O spots |
| | | | | | B1000 | Excellent | MD-D #8 | D #8 | D #8*** | | |

Tape Adhesion Results (All others had no film removal)
*Slight on blisters
**⅛" on ⅜ leg
***One blister The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What is claimed is:

1. A latex composition capable of forming stable films which have excellent protective properties, good chemical resistance, and/or permeability to gases and water vapor, comprising particles suspended in an aqueous solution, said particles comprising an interpolymer of
   a) an acrylic latex seed particle, and
   b) vinylidene chloride polymer comprising
      i) vinylidene chloride,
      ii) one or more alkyl acrylates having from 1 to 18 carbon atoms in the alkyl group and/or one or more alkyl methacrylates having 1 to 18 carbon atoms in the alkyl group,
      iii) one ore more aliphatic alpha-beta-unsaturated carboxylic acids, and
      iv) a copolymerizable surface active agent, which is an ethylenically unsaturated sulfonate,
the proportion of vinylidene chloride being 65 to 90 parts by weight, the portion of said alkyl acrylates and/or methacrylates being from 2 to 30 parts by weight, the portion of said carboxylic acids being from 0.1 to 10 parts by weight, and the portion of said copolymerizable surface active agent being from 0.1 to 5.0 parts by weight, all based upon parts per hundred weight of monomer.

2. The composition of claim 1 wherein said acrylic latex comprises 1 to 60 weight percent of the latex composition.

3. The composition of claim 1 wherein said vinylidene chloride polymer comprises
   a) 70 to 85 parts by weight vinylidene chloride,
   b) 10 to 25 parts by weight alkyl acrylate and/or methacrylate,
   c) 0.5 to 5 parts by weight carboxylic acid, and
   d) 0.4 to 1.0 parts by weight of copolymerizable surface active agent.

4. The composition of claim 1 wherein said acrylic latex is a copolymer of a styrene and an acrylate.

5. The composition of claim 1 wherein said copolymerizable surface active agent is sodium 1-allyloxy-2-hydroxypropyl sulfonate.

6. The composition of claim 1 wherein said copolymerizable surfactant is an allyl ether sulfonate.

7. The composition of claim 1 wherein said acrylic latex comprises 5 to 50 percent by weight of said latex composition.

8. The composition of claim 1 wherein said acrylic latex comprises 5 to 15 percent by weight of said latex composition.

9. The composition of claim 1 wherein said alkyl acrylate is 2-ethylhexyl acrylate and said methacrylate is methyl methacrylate.

10. The composition of claim 1 wherein said carboxylic acids comprise acrylic acid and methacrylic acid.

* * * * *